(12) United States Patent
Hoene et al.

(10) Patent No.: US 6,705,980 B2
(45) Date of Patent: Mar. 16, 2004

(54) REMOVAL DEVICE FOR TUBE WEBS MADE OF PLASTIC FILM

(75) Inventors: Michael Hoene, Osnabrueck (DE); Franz Plasswich, Bremen (DE)

(73) Assignee: Windmoeller & Hoelscher, Lengerich (DE)

( * ) Notice: Subject to any disclaimer, the term of this patent is extended or adjusted under 35 U.S.C. 154(b) by 32 days.

(21) Appl. No.: 09/928,239

(22) Filed: Aug. 13, 2001

(65) Prior Publication Data

US 2002/0048617 A1 Apr. 25, 2002

(30) Foreign Application Priority Data

Aug. 11, 2000 (DE) .......................................... 100 40 055

(51) Int. Cl.$^7$ .............................................. B29C 53/00
(52) U.S. Cl. ........................................ 493/339; 53/450
(58) Field of Search ............................. 493/339; 53/450

(56) References Cited

U.S. PATENT DOCUMENTS

| 3,768,949 A | * | 10/1973 | Upmeier .................... 425/392 |
| 4,726,168 A | * | 2/1988 | Seko .......................... 53/450 |
| 5,013,234 A | * | 5/1991 | Reinhold .................... 425/327 |
| 5,437,544 A | * | 8/1995 | Achelpohl ................. 425/72.1 |
| 6,241,502 B1 | * | 6/2001 | Baeumer et al. .......... 425/72.1 |

FOREIGN PATENT DOCUMENTS

EP 0 873 846 10/1998

* cited by examiner

*Primary Examiner*—Rinaldi I. Rada
*Assistant Examiner*—Brian D Nash
(74) *Attorney, Agent, or Firm*—Jacobson Holman PLLC

(57) ABSTRACT

A lay-flat removal device for a plastic tube film web with a lay-flat and squeezing device having lay-flat plates and squeezing rolls that are rotatable in a reversing manner around an axis of a supplied film tube. The removal device includes a first reversing, non-rotational pneumatic reversal rod and a first reversing, rotating deflection roll mechanically connected to one another in a first fixed transmission ratio to form a first functional pair which is driven by a first motor, and a second reversing, non-rotational pneumatic reversal rod and a second reversing, rotating deflection roll mechanically connected to one another in a second fixed transmission ratio to form a second functional pair driven by a second motor. The motors are controlled in such a way that the different functional pairs cover angles of rotation that can be determined in a variable manner.

2 Claims, 1 Drawing Sheet

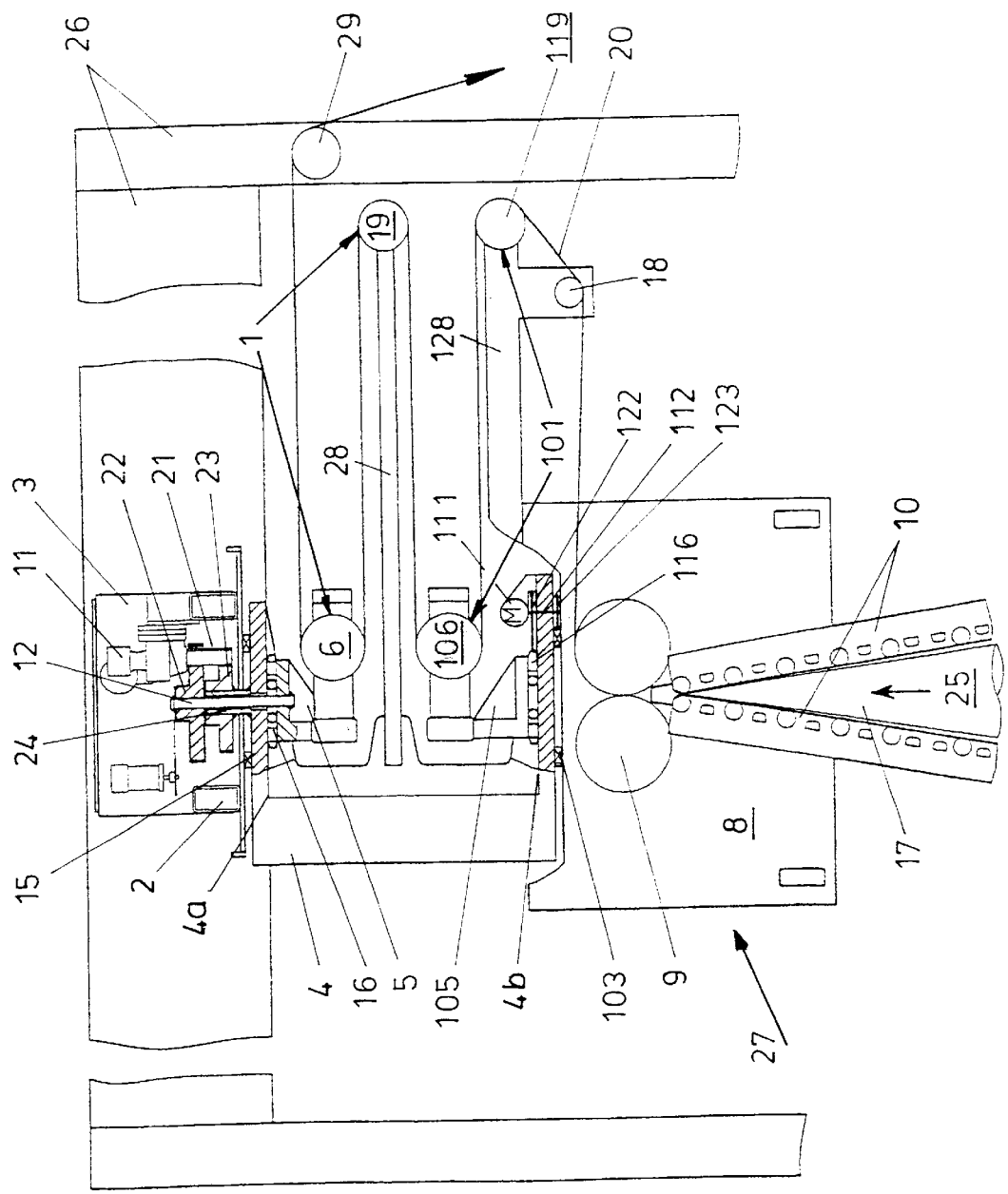

REMOVAL DEVICE FOR TUBE WEBS MADE OF PLASTIC FILM

BACKGROUND OF THE INVENTION

1. Field of the Invention

The invention relates to a lay-flat and removal device for a plastic tube film web produced by means of a film blowing head arranged in a stationary manner, whose lay-flat plates and squeezing rolls may be rotated in a reversing manner around the axis of the supplied film tube, and having a subsequent fixed winding device or device for further processing as well as at least two reversing pneumatic reversal rods and at least two reversing deflection rolls.

2. Description of the Related Art

In the production of tube webs made of plastic film with the aid of blowing processes, tolerances in film thickness cannot be prevented. These tolerances arise, for example, from production tolerances of the blowing head and of the extruder as well as fluctuations of temperature and temperature gradients outside of the extruder. Because the extruded tubes are first laid flat and then wound for further processing, unavoidable thickness tolerances along the circumference of the blown film tube lead to difficulties because the above-mentioned thickness tolerances accumulate in the wound film, form annular rings, and prevent a cylindrical wound film.

The produced film is damaged in this manner and the space-saving storage and further processing of the same is complicated.

In order to prevent the accumulation of thickness tolerances on the wound film, so-called reversing removal devices with pneumatic reversal rods and deflection rolls are used for the tube web. Such devices are known from the literature.

For the purpose of pivoting the reversal elements (pneumatic reversal rods or deflection rolls), EP 0 873 846 recommends, among other things, assigning a rim bearing to each reversal element and providing each reversal element with its own drive motor.

However, such a measure requires large control or even regulation expense so as to control the various drive motors in such a way that the reversal motions of the various pneumatic reversal rods and deflection rolls are precisely coordinated with one another.

Poorly coordinated reversal motions of the pneumatic reversal rods and deflection rolls, which can naturally also be caused by mechanical tolerances in the removal device itself, lead to serious disadvantages such as the formation of creases in the film or an offset of the edges of the film on the rolls. The different mechanical properties of different film materials, of which their friction on the reversal elements and their elasticity are of primary significance in this connection, serve to further complicate the coordination of reversal movements when changing films. Therefore, a device in which each reversal element has its own drive even requires an extensive regulation of reversal movements in order to synchronize the movement of the various reversal elements even when processing different film materials in an appropriate form.

SUMMARY OF THE INVENTION

The object of the present invention is therefore to improve a removal device of the type mentioned at the outset in such a way that the expenditure on control and regulation technology is reduced to an economically feasible amount. This object is attained by virtue of the fact that, when at least two pneumatic reversal rods and at least two deflection rolls are used, one pneumatic reversal rod and one deflection roll each form a functional pair. In each functional pair, the deflection roll and the pneumatic reversal rod are mechanically connected to one another in a fixed transmission ratio. The rotational momentum necessary for pivoting the reversal elements of each functional pair is supplied by one motor each.

The mechanical restricted guidance of one deflection roll each and one adjacent pneumatic reversal rod each relative to one another as well as the assignment of one motor each to these two reversal elements of one functional pair structures the regulation in a significantly simpler fashion. In this connection, it is particularly advantageous for the coupling of the movement of the two reversal elements of a functional pair to be in a ratio of 1:2, with other coupling ratios being known as well.

Devices according to the invention have two or more functional pairs. Thus, the possibility exists of varying pivoting motions of the various pairs relative to one another. Thus, for example, the reduction in the pivot angle of various functional pairs that generally occurs in the processing direction can be reduced in order to reverse particularly delicate films more gently.

In the case of the recommended device, processes of this type can optionally be performed by individually controlling the motors assigned to the various functional pairs.

In the case of a plurality of pairs, a steadily slight reduction of the angle of reversal can be provided in the processing direction of the film.

BRIEF DESCRIPTION OF THE DRAWINGS

Further features and advantages of the invention can be found in the further subclaims and the following description in connection with the drawings, in which exemplary embodiments of the invention are schematically shown. The figure shows:

A side view of a device according to the invention with two functional pairs, each comprising one pneumatic reversal rod and one adjacent deflection roll, with a motor being assigned to each pair.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

In the figure, a side view of an embodiment of a device according to the invention is shown with two functional pairs 1 and 101. The fixed machine frame 26 has two upper crosswise supports 2 to which a drive housing 3 is attached. A rim bearing 15 is handing on this drive housing 3, which bearing carries a C frame 4 on its upper, freely tapering arm 4a.

The freely tapering arm 4a of the C frame 4 supports the console 5 by way of a rim bearing 16. This console is connected to the upper pneumatic reversal rod 6.

The upper deflection roll 19 is connected to the C frame 4 by way of the support 28. With the lower freely tapering arm 4b of the C frame 4, the console 105 is connected to the rim bearing 116. The lower pneumatic reversal rod 106 is fixed on this console 105. The lower freely tapering arm 4b also supports the lay-flat and squeezing device 27 by way of the rim bearing 103.

The lay-flat and squeezing device 27 has the support plates 8 as a support element. These support plates 8 support the squeezing roll pair 9 and the lay-flay plate 10. The lower deflection roll 119 and the guidance roll 18 are also connected to the support plates 8 by way of the supports 128.

The rotational momentum necessary for the pivoting motion is provided to the four reversal elements (the two pneumatic reversal rods 6, 106 and the two deflection rolls 19, 119) in the following manner:

The motor 11 drives the pinion 21, which interlocks with the toothed wheels 22 and 23. The upper toothed wheel 22 pivots the console 5 with the aid of the drive shaft 12, which protrudes through the hollow shaft 24 and the upper arm 4a with the necessary play, such that the pneumatic reversal rod 6 connected to the console 5 reverses in the desired manner.

The lower toothed wheel 23 is connected to the hollow shaft 24, which is also mounted in such a way that it can rotate around its primary carrying axle. This hollow shaft 24 transfers the rotational moment on to the C frame 4 and, in this manner, ensures that the entire C frame 4, which is connected to the deflection roll 19 by way of the support 28, also reverses in the desired manner. In the exemplary embodiment shown here, the tooth number ratio between the two toothed wheels 22 and 23 is 2:1.

The motor 111, which drives the shaft 112, is located on the lower arm 4b of the C frame 4. This shaft 112 reaches through the lower arm 4b with the necessary play. The lower toothed wheel 123 is attached to the shaft 112 below the arm 4b, which toothed wheel interlocks with the rim bearing 103 and pivots the entire lay-flat and squeezing device 27 in this manner. The deflection roll 119 and the guidance roll 18 are also attached to this device by way of the support 128.

Thus, these two rolls can perform the desired reverse movement as well.

The shaft 112 of the motor 111 also moves an upper toothed wheel 122 that interlocks with a rim bearing 116. In this manner, the console 105 and the pneumatic reversal rod 106 connected to it 105 is pivoted.

The tooth number ratio between the toothed wheels 122 and 123 and the rim bearings 103 and 116 in this exemplary embodiment is coordinated in such a way that the deflection roll extends over twice the pivot angle as the pneumatic reversal rod.

The film material travels through the device shown in the figure in the following manner:

After it leaves the extruder, which is not shown, and the blowing head, which is also not shown, the inflated film tube 17 travels in the direction indicated by the reference numeral 25 into the lay-flat and squeezing device 27 and is laid flat there.

The film web 20 then passes over the reversing rotating deflection roll 19 and, from there, to a non-rotating pneumatic reversal rod 6, which also reverses. After is has passed through this upper functional pair 1, the film can be supplied to a winder, which is not shown, or a direct subsequent processing apparatus, which is also not shown, by way of a stationary, non-reversing removal roll 29.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A lay-flat removal device for a plastic tube film web comprising:
    a machine frame;
    a C-frame having an upper and lower arm, said upper arm coupled to said frame through a first rim bearing;
    a first reversing, non-rotational reversal rod and a first reversing, rotating deflection roll mechanically connected to one another in a first fixed transmission ratio to form a first functional pair, said first reversal rod connected to said upper arm through a second rim bearing and said first deflection roll connected to said C-frame through a first support member;
    a first motor for driving said first functional pair;
    a lay-flat and squeezing device supported by a support plate and also by said lower arm of said C-frame through a third rim bearing, said lay-flat and squeezing device having lay-flat plates and squeezing rolls that are rotatable in a reversing manner around an axis of a supplied film tube;
    a second reversing, non-rotational reversal rod and a second reversing, rotating deflection roll mechanically connected to one another in a second fixed transmission ratio to form a second functional pair, said second reversal rod connected to said lower arm through a fourth rim bearing and said second deflection roll connected to the support plate through a second support member;
    a second motor for driving said second functional pair, said first and second motors being separately controllable so that said first and second functional pairs cover angles of rotation that may be determined variably to provide a slight decrease in the angle of rotation covered by said first and second functional pairs in a processing direction of the supplied film tube;
    a first console supporting said first reversal rod on said upper arm, said first console being pivoted by said first motor driving a drive shaft which protrudes through a hollow shaft formed in said upper arm of the C frame, said first and second rim bearings being rotated by said first motor through a first upper toothed wheel and a first lower toothed wheel, said first lower toothed wheel being connected to said hollow shaft;
    said second motor being located on the lower arm of said C-frame and driving a second drive shaft, that reaches through said lower arm, using a second upper toothed wheel and a second lower toothed wheel, a tooth number ratio between said second upper and second lower toothed wheels being such that the second deflection roll extends over twice a pivot angle as the first reversal rod, said second lower toothed wheel being attached to said second drive shaft below the lower arm to interlock with said third rim bearing and thereby pivot the lay-flat and squeezing device, said second drive shaft also moving the upper toothed wheel that interlocks with said fourth rim bearing such that said second reversal rod is pivoted.

2. The device as set forth in claim 1, wherein a tooth number ratio between said first upper and first lower toothed wheels is 2:1.

* * * * *